Sept. 3, 1946.  K. V. LINDKVIST  2,407,168
APPARATUS FOR MOLDING CONCRETE
Filed Nov. 29, 1943  4 Sheets-Sheet 1

Inventor
Knut Vilhelm Lindkvist
By Henry C. Parker
Attorney

Inventor
Knut Vilhelm Lindkvist
By Henry C. Parker
Attorney

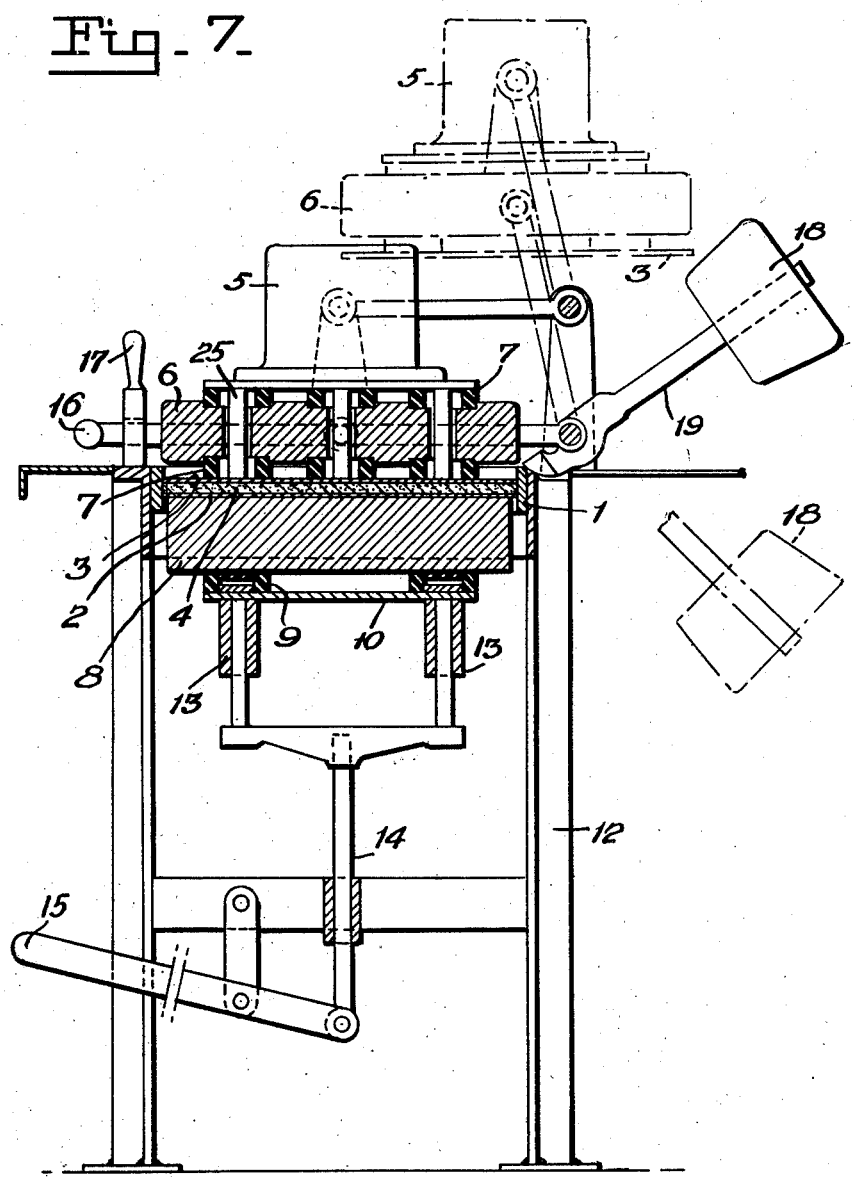

Sept. 3, 1946.　　　K. V. LINDKVIST　　　2,407,168
APPARATUS FOR MOLDING CONCRETE
Filed Nov. 29, 1943　　　4 Sheets-Sheet 4
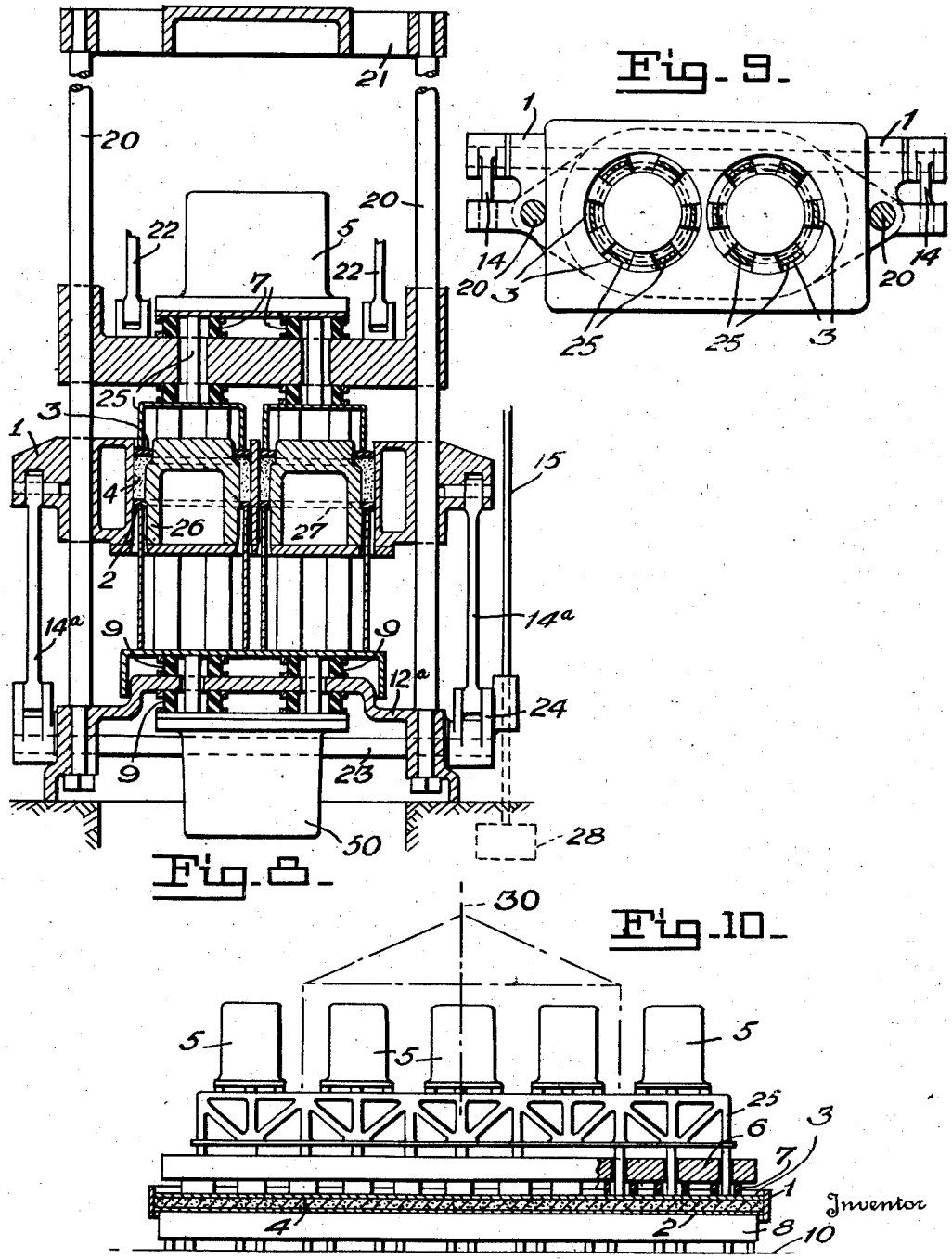
Inventor
Knut Vilhelm Lindkvist
By Henry C. Parker
Attorney Patented Sept. 3, 1946

2,407,168

UNITED STATES PATENT OFFICE 2,407,168

APPARATUS FOR MOLDING CONCRETE

Knut Vilhelm Lindkvist, Stockholm, Sweden, assignor to Aktiebolaget Vibro-Betong, Stockholm, Sweden Application November 29, 1943, Serial No. 512,272
In Sweden November 28, 1942

10 Claims. (Cl. 25—41)

(Granted under the provisions of sec. 14, act of March 2, 1927; 357 O. G. 5)

The present invention has for its object an apparatus for the manufacture of molded bodies from materials having the form of grains. By the expression "the form of grains" in the specification and claims is meant all occurring grain sizes, from powder up to sizes of lumps for instance commonly used for aggregates in concrete work. According to the inventive principle, the material is compacted during the molding by being simultaneously subjected to vibration and a resiliently acting pressure, the latter being applied in suitable directions in relation to the vibratory motion. The invention is particularly useful in connection with the manufacture of various kinds of molded bodies such as slabs, blocks and hollow bodies, e. g. sockets, pipes, culverts, hollows tiles, blocks for floorings, beams and other objects of uniform or compounded materials.

It is previously known in the manufacture of molded bodies of similar kind and materials, to effect a compacting of the material during molding by mechanical means, such as slowly acting inelastic pressures, more rapid blows and impacts or by shaking or vibration. It is also known to subject the molded body during the vibration to a certain mechanical pressure, but contrary to the process according to the present invention, said pressure has in such cases acted bluntly (inelastically) on the material in the mold and not elastically (resiliently) as is in principle provided in the present invention.

In order to produce this desired effect an arrangement is used according to the invention, which in principle consists of a mold combined with suitable means (vibrators) for imparting vibratory impulses to the same and having a plate or wall which is subjected to the action of an elastic pressure, and another plate or wall opposite this and movable in relation thereto, said plates or walls being connected to resilient means, so that at least one of the walls will be able fairly easily to follow the vibratory impulses imparted to the mold. The walls in question are suitably, each for itself, by contacting with or in some other suitable way, connected to in relation to each other movable masses (e. g. metal blocks or other weights) of materially different magnitude (inertia), so that one of the walls owing to the greater inertia will, in cooperation with the aforementioned resilient means, absorb or dampen such vibratory movements of the material in the mold which are directed towards said wall, thanks to the fact that it forms a different oscillating system than the enclosed material. Instead of by means of weights the system may of course in some other way be given the desired inertia (apparent mass) e. g. by a suitable spring tension.

The realization of the inventive principle is visible from the attached drawings in which:

Fig. 7 is a side view of a suitable type of machine for the manufacture of slabs.

Figures 8 and 9 show a machine for the manufacture of pipes, hollow tiles and the like, as seen from the side and in horizontal section respectively.

Fig. 10 shows, as seen from the side, a vibration machine according to the invention, particularly intended for the production of large, comparatively thin slabs.

Parts chiefly corresponding to each other are indicated by the same numeral in the various figures.

Figure 1:
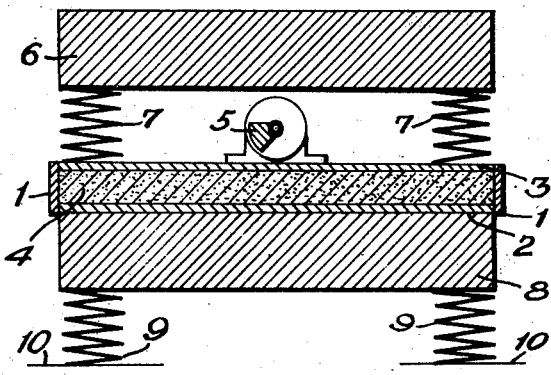
Figures 1–6 show different ways for imparting the elastic pressure and the vibration impulses to the mold.
Figure 2:
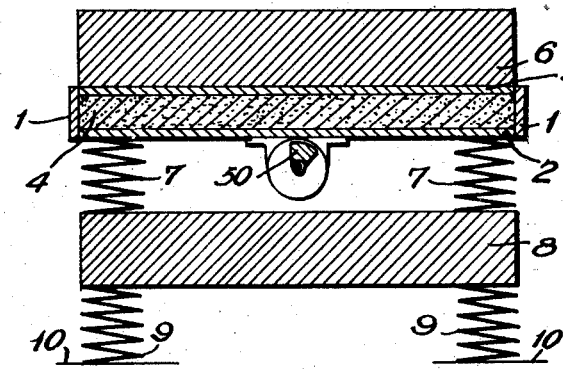
Figure 3:
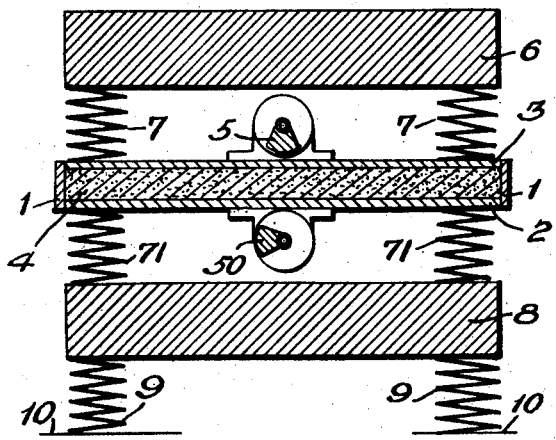

In the arrangement diagrammatically shown in Figure 1, numeral 1 denotes a mold-frame for the sides, 2 the bottom plate or wall, and 3 the upper plate or wall of the mold. The material subjected to molding is denoted by 4. On top of the upper wall 3 of the mold is arranged a suitable vibrator 5 of known type and a weight 6, which by the aid of resilient means 7, e. g. springs, acts upon the wall 3, and thus also on the material enclosed in the mold, with an elastic pressure. The lower wall 2 of the mold rests on a second weight 8, which in turn rests on a foundation 10 by means of the intermediate resilient buffering 9. The two plates or walls 2 and 3 are movable in relation to each other. The arrangement shown in Fig. 2 deviates from that shown in Fig. 1 only in so far as the vibrator, denoted by 50, in this latter case is applied to the lower side of the mold. In the arrangement shown in Fig. 3 both the upper and the lower side of the mold are directly combined with a vibrator, 5 and 50 respectively, so that the material is acted upon from both sides, at the same time as being subjected to a resilient compression by means of the upper weight 6.

Figure 4:
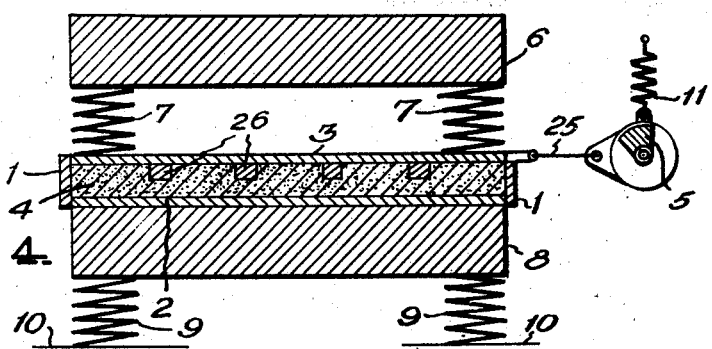
Figure 5:
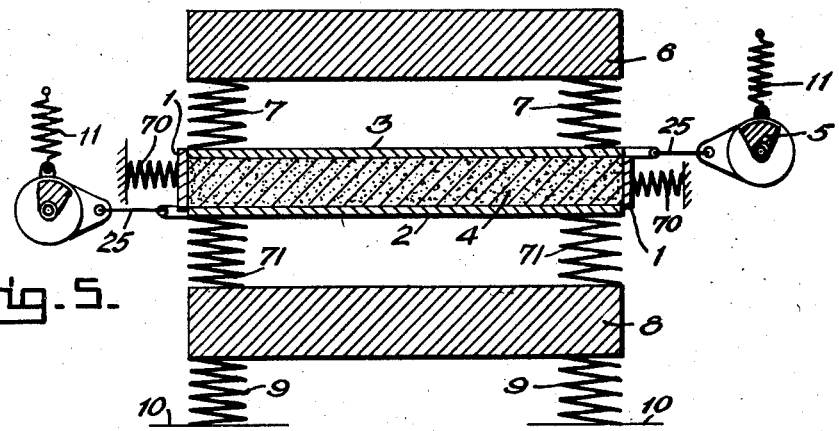
Figure 6:
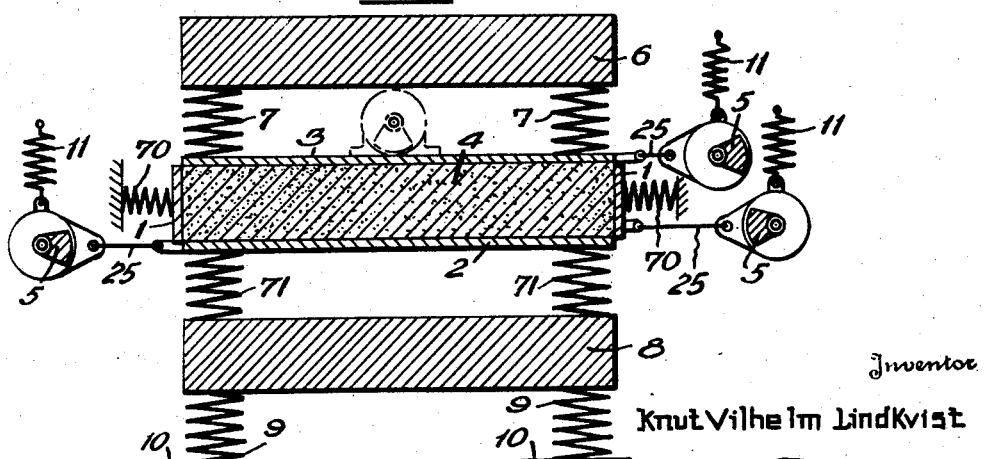

Fig. 4 shows a modification of the arrangement according to Fig. 1 in regard to the mode of imparting the vibration impulses to the material in the mold. In this latter case the mold is acted upon by chiefly laterally imparted vibration impulses, thus acting mainly in directions substantially at right angle to the elastic pressure, the vibrations being conveyed from the resiliently suspended vibrator 5 by means of a linked member 25. This figure shows cores 26 placed in the mass 4, as an example of the manufacture of a slab provided with openings. Such cores may of course also be placed in the mass in the cases shown in the other figures. The vibrator 5 may in a suitable manner, e. g. by means of the spring suspension 11, be connected to the common frame of the apparatus. In the arrangement shown in Fig. 5 double vibrators are used, one of which is combined with the bottom and the other with the top part of the mold. The mold is in this case shown as also being provided with laterally acting resilient means in the form of buffers 70, the lower wall 2 of the mold also being elastically movable in relation to the counterweight 8, by means of resilient members 71. Such resilient means, acting laterally and in the bottom, may of course, if suitable, also be provided in the other cases. The resilient means 71 at the bottom are particularly advantageous in such cases when the wall 2 of the mold is to be movable in relation to the counterweight 8. In the arrangement shown in Fig. 6 there are three vibrators, one of which acts on the mold-frame 1 while the two others act on the upper and lower plates or walls of the mold in the same way as in Fig. 5. The arrangements shown in Figs. 1–6 are only diagrammatical examples of various ways for arranging vibrators and compressing means, as it is evident that a number of other possibilities for combinations exist within the scope of the invention. The direction of impulse action to be selected for the vibrators will in each separate case particularly depend on the size and shape of the manufactured products.

In Fig. 7 is shown a practical realization of the above related principles, in the form of a machine for making smaller slabs and blocks, e. g. roofing-tiles, flooring-stones and the like. The springs shown in the diagrammatical Figures 1–6 are in this case represented by rubber-cushions. The material is enclosed in the mold-frame 1 between upper and lower plates 3 and 2. The vibration impulses are imparted to the upper side of the product from the vibrator 5 which, by means of vertical spindles or the like 25, acts directly on the upper vibrating light mold-wall 3, but it should be evident from the foregoing that the vibrations may be imparted from below or from any other suitable direction without deviating from the inventive principle. The material 4 which is subjected to vibration in the mold is simultaneously acted upon by an elastic pressure from the weight 6, which by means of rubber springs 7 loads on the mold-wall 3. Corresponding rubber springs between the upper side of the weight 6 and the platform of the vibrator 5 entails a complete elasticity of the pressure acting upon the mold. The bottom plate 2 of the mold, which is movable in relation to the upper plate (mold-wall) 3, rests directly on the counterweight 8 without intermediate resilient means. The counterweight 8 has suitably a greater mass than the weight 6, in order to prevent the formation of a harmonically oscillating system and thus to absorb the vibrations moving in a downward direction. The counterweight 8 rests by intermediation of rubber springs 9 on a table 10 which, by means of a supporting link or spindle 14 and a pedal or lever 15 connected thereto, is arranged to be raised and lowered in guides 13. The object of the resilient means 9 is to prevent possible oscillations of the counterweight 8 to be transmitted to the machine-frame 12. The press-weight 6 may, by means of the lever 16 which in the lowered position is locked by the latch 17, be swung upwards so that the pressure load is removed from the upper plate 3 of the mold and this latter laid free for filling and emptying of the mold. In the latter case the ready treated product is shoved upwards out of the mold by means of pressing down the lever 15. In order to facilitate the upward swinging of the weight 6 a counterweight 18 is provided, which by means of linked members is connected to the weight 6, the vibrator 5 arranged above this, and the upper plate 3, so that these parts will assume the position shown with dotted lines in Fig. 7 when the lever 16 is raised. The counterweight 18 is disconnected when the weight 6 is in the lowered position, e. g. by means of the counterweight carrying arm 19 which is rigidly united to the lever 16 being brought out of catch with the link-system of the weight 6, with which it is in catch with its lower hook-formed part when the lever 16 is being raised. When the lever 16 is in its fully lowered position and the weight 6 loads on the mass, the counterweight 18 is thus unable to influence the work of the pressing and vibrating system.

The modification shown in Figs. 8 and 9 is particularly suited to the manufacturing of hollow bodies such as hollow tiles, pipes, blocks and the like. The machine consists of a frame 12a with two uprights 20, which act as guides for the molding box frame 1 as well as for the member 6 (weight or the like) which produces the pressure. The uprights 20 are at the top held together by a cross-piece 21 which carries a hoisting arrangement (not shown) which is connected to the rods 22 for raising and lowering of the press-member 6. The molding box 1 may be raised and lowered by means of a lever 15 which turns the shaft 23, levers 24 and supporting links 14a actuated by these latter, so that the molding box will slide along the uprights 20. The position of the molding box is determined in a manner known per se by means of adjustable stops for the levers 24, whereby the compression of the material under forming may be determined to the desired degree. Two vibrators are provided for vibrating the material, one upper 5 and one lower 50, which by means of spindles, sleeves or other rigid members 25 act directly on parts belonging to the mold, e. g. an upper annular plate 3, and a lower annular part 2 and a core 26 cooperating with this latter, in such cases when tube-shaped bodies are made. The vibrators are by means of rubber cushions or the like, 7 respectively 9, resiliently connected to the press-member 6 and the frame 12 in chiefly the same manner as previously described in connection with the arrangements shown in Figs. 3 and 7. The press member 6, which suitably consists of a heavy plate, is in the same way resiliently connected to the plate 3, so that the pressure will act elastically on this.

The machine operates in the following manner. The press-member 6 with vibrator 5 resting thereon by the intermediation of the resilient members 7, is raised a certain distance by means of the rods 22 connected to the hoisting arrangement (crane motor or the like) and the molding box with cores is placed in its working position (the position shown in Fig. 8). The material which is to be molded is raked into the molding box by means of crosswise movements of a rake. After this the press-member 6 with vibrator 5 is lowered and the two vibrators 5 and 50 started up in order to work the material 4 enclosed in the molding box formed by the upper and lower rings 3 and 2 respectively, the mold-frame 1, and core 26. As seen from Fig. 8 a number of molded bodies may simultaneously be manufactured by using a suitable number of cores and rings in each machine.

When the molded body has very small dimensions it is suitable first to vibrate the material with the lower vibrator only, while the weight and the upper vibrator are in a raised position, in order to shake down the material in the mold, after which more material is filled in with the rake. After the material in this way has been brought to entirely fill up the mold, the upper vibrator 5 and the press-member 6 may be lowered into working position, and the material worked with vibration and simultaneous elastic pressure. After completion of the press-vibration the vibrators are stopped, the press-member 6 with vibrator 5 is raised and the molding box pulled down by manipulating the lever 15, whereby the product is laid free so that it may be lifted away. By placing a suitably formed, e. g. annular plate 27 on top of the lower sleeve-shaped members 25 surrounding the cores, said plate 27 may be used for lifting away several molded bodies at the same time. These may of course also in some other suitable way be transferred from the vibration-press to the next operative step, e. g. hardening, burning or the like.

All vertically movable weights are suitably as much as possible counterbalanced by means of counterweights, according to the same principle as described for the apparatus shown in Fig. 7, i. e. so that the counterweights will facilitate the manipulation of levers, etc., as for instance indicated by numeral 28 in Fig. 8, but not influence the press-member 6 when this is to act with an elastic pressure on the work-piece. The pressure is of course as a rule in the simplest way produced by shaping the part 6 as a weight, as already described, but it is evident that an elastic pressure may also be produced e. g. by hydraulic power, crank levers or the like, which are applied in such a manner that they will act elastically on the mold according to the working principle set forth in Figs. 1–6.

The machine shown in Fig. 10 is especially intended for the production of larger concrete slabs, both without and with reinforcement in the form of reinforcing irons, steel wires ("string concrete"), steel wire netting etc. The arrangement differs from that shown in Fig. 7 chiefly by the fact only, that several vibrators 5 simultaneously work the same side of the product, these vibrators preferably being synchronised in regard to the vibration impulses produced. The impulses of the vibrators are transmitted to the upper plate 3 of the mold by means of a rigid frame-work 25 of steel tubing, welded section steel or the like, so that the vibrations will be conveyed to the material under forming without any appreciable losses due to resiliency. The elastic pressure to be used according to the invention is produced by weights 6 which, in the same manner as previously described, act against the upper mold-plate 3 with the intermediation of resilient members, suitably rubber buffers 7. Such elastic means are suitably also arranged between the upper side of the weights 6 and the frame-work 25 to obtain a complete elasticity of the pressing system. The bottom plate 2 of the mold rests inelastically against a plate 8 which, similar to the arrangement shown in Fig. 7 with the same indication, acts as a counter-weight or brake owing to its mass. To prevent such vibrations which are possibly set up in the plate 8, from being transmitted from the machine to the floor or foundation on which it is placed, the plate 8 also rests on resilient elements 9. Around the upper edge of the plate 8 is arranged a removable guard 1, suitably composed of two longitudinal and two transversal parts held together by bolts or the like, so that together with the bottom plate 2 a molding box is formed, in which the material to be molded is filled in. The frame-work 25 with weights 6 and vibrators 5 may be raised, lowered and moved by means of a travelling crane arrangement 30 diagrammatically indicated in the drawings. The upper mold-plate 3, which should have such a low weight that it is able without difficulty to follow the impulses given by the vibrators, may either be united with the frame-work 25 or be loosely placed on the material after the mold has been filled. The plate 3 is suitably divided into a number of sections or cut out in some other way, so that interstices in the form of slits are formed, through which water may escape or be sucked away when water containing mixtures are vibrated and compacted. It is also of importance that air which is enclosed in the loose material is given a possibility to escape without too much hindrance in places not too far apart, in order to obtain a fully homogeneous or even product.

The springs 7 between the plate 3 and the weights 6 are in this as well as in the other described cases selected of such stiffness, that a desired relation between on the one side the elastic press-power and on the other side the action of the vibrators on the mold-wall which transmits the pressure and the vibrations (plate 3 in the present case) is realized. For this reason it may in certain cases be suitable to use spring-members with a stiffness which in a manner known per se may be changed (adjusted) and/or masses which may be changed. Thus the mass of member 6 may be altered by adding or removing movable weights or by means of loading the member 6 with liquid-containers, the content of which may be easily changed by means of a pump. When using hydraulic press power, in which case according to the invention an elastic part is placed between the piston and the member which transmits the pressure to the mold-wall, such a relative adjustment of pressure and vibrating action is of course very easy to realize. If desired the adjustment may by known expedients be made automatic.

The upper part of the apparatus need not have the same length as the lower part, but may instead suitably be made shorter, particularly in the case of manufacturing elongated slabs, e. g. so called string-concrete slabs which frequently have a length of up to 150 ft. or more. In such cases the upper part may instead be moved over the mold in succession. In the same way the invention may also be applied to the working of road surfaces by means of vibrating and a simultaneously acting elastic pressure.

The sides 1 of the mold may in the examples shown in Figs. 7–10 be rigidly arranged or elastically movable in a vertical or lateral direction in relation to the machine-frame, according to the principles of construction shown in Figs. 1–6.

In the foregoing a number of examples has been given of arrangements in which the elastic pressure is applied from above, but it ought to be evident that it may be caused to act from some other direction, e. g. from below. This latter way is particularly useful for providing an easy escape of air which is enclosed in the mass and which, owing to the natural buoyancy, has a tendency to move in the direction towards the upper surface of the mass. Thus the apparatus shown in Fig. 7 may suitably be altered in such a manner that, instead of the weight 6 acting on the upper plate 3, an elastic pressure is applied to the lower plate 2, e. g. with the intermediation of the lever-system 14, 15 acting on the table 10, or by means of combining the spindle 14 with a hydraulic press-piston. In these cases the vibrator 5 is suitably arranged on the underside, so that it will act on the lower plate 2 in principally a similar manner as the vibrator 50 in Fig. 8. In this modification of the apparatus shown in Fig. 7 the counterweight 8 may suitably be arranged on the upper side in inelastic contact with the plate 3, or else be dispensed with if the plate 3 is in itself of sufficient weight. It is of course also possible, when employing an elastic pressure applied from below, to use both lower and upper vibrators acting on opposite sides of the mold as for instance according to Fig. 8. The vibrators may also be connected in chiefly the same manner as diagrammatically indicated in the principal cases shown in Figs. 1–6.

I claim:

1. An apparatus for producing molded bodies of concrete and the like, which comprises a frame, a mold resiliently mounted in said frame and formed by walls one of which is movable relative to the wall opposite and adapted to compress the material in the mold, vibratory means directly and inelastically contacting one of said opposite walls, means for applying pressure against the same wall in such manner as to compress said material, and resilient means interposed between said mold wall and said pressure means in such manner that the pressure is applied resiliently.

2. An apparatus for producing molded bodies of concrete and the like, which comprises a frame, a mold resiliently mounted in said frame and formed by walls one of which is movable relatively to the wall opposite and adapted to compress the material in the mold, means directly connected to said movable wall for vibrating the same inelastically, means also connected to said movable wall for applying pressure thereto in order to compress said material, and resilient means interposed between said pressure means and said movable wall in such manner that the pressure is applied resiliently.

3. An apparatus for producing molded bodies of concrete and the like, which comprises a frame, a mold resiliently mounted in said frame and formed by walls one of which is movable relative to the wall opposite and adapted to compress the material in the mold, means directly connected to said movable wall for vibrating the same inelastically, means also connected to said movable wall for applying pressure thereto in order to compress said material, resilient means interposed between said pressure means and said movable wall in such manner that the pressure is applied resiliently, a movable mass attached to the mold wall opposite said movable wall and forming therewith a system having an inertia substantially greater than that of the system comprising said movable wall and adapted to damp the vibrations set up by said vibrating means, and resilient means for supporting said mold, said vibrating means and said movable mass.

4. An apparatus for producing molded bodies of concrete and the like, which comprises a frame, a mold resiliently mounted in said frame and formed by walls at least one of which is adapted to compress the material in the mold, means for raising and lowering the mold in said frame, a heavy plate directly and inelastically attached to one of said mold walls, elastic means for supporting said plate and mold wall, means directly in contact with the wall opposite said heavy plate for vibrating the wall inelastically, pressure means connected with said opposite wall for moving the same to compress the material in said mold and resilient means interposed between said pressure means and said opposite wall in such manner that the pressure is applied resiliently.

5. Apparatus for the manufacture of molded slabs having a great elongation using simultaneously acting elastic pressure and vibrations, said apparatus comprising a mold, movable upper and lower plates forming the top and bottom of said mold, means in inelastic contact with the upper plate for vibrating the same, a weight-member adapted to be subjected to an elastically acting pressure, and elastic members interposed between said weight member and said upper plate for transmitting said pressure elastically to said upper plate, a heavy weight directly attached to said lower plate and forming with said plate a system having an inertia substantially greater than that of the system formed by said upper plate and vibrating means and a resiliently mounted support for holding said heavy weight and lower plate.

6. In an apparatus for manufacturing molded bodies using simultaneously acting elastic pressure and vibrations, a mold, two movable plates forming opposite walls of said mold, vibrators adapted to act directly and inelastically upon at least one of said plates, elastic members connected to one of the plates acted upon by said vibrators, pressure means adapted to exert pressure through said elastic members against said wall and means for supporting said mold and vibrators resiliently.

7. In an apparatus for manufacturing molded bodies from materials having a grain form, using simultaneously acting elastic pressure and vibrations, a frame, a mold mounted in said frame, means for raising and lowering said mold in said frame, a movable wall forming the bottom of said mold, elastic means connected between said movable wall and said frame for supporting said wall, a vibrator directly and inelastically connected to said wall for vibrating the same, a movable upper wall forming the top of said mold, elastic members, pressure means adapted to act through said elastic members to exert a pressure against said upper wall and a vibrator acting directly and inelastically on said upper wall.

8. An apparatus for producing molded bodies of concrete and the like, which comprises a frame, a mold resiliently mounted in said frame, a movable plate of relatively small inertia forming one of the walls of said mold, a vibrator directly connected to said wall and adapted to vibrate said wall inelastically, a plate forming a wall of said mold opposite said movable plate, a heavy weight directly attached to said opposite plate and forming therewith a system having an inertia substantially greater than the inertia of the system formed by said movable plate and said vibrator, means for applying pressure to said mold to compress the material contained therein, and at least one resilient element interposed between said pressure means and the mold in such fashion that the pressure is applied resiliently.

9. In an apparatus for manufacturing molded bodies using simultaneously acting elastic pressure and vibrations, a frame, a mold, elastic members supporting said mold in said frame, two movable plates forming opposite walls of said mold, vibrators directly attached to one of said plates adapted to vibrate said plate inelastically and forming with said plate a system of relatively small inertia, a heavy weight directly and inelastically attached to the second movable plate tending to damp out the vibrations produced by said first plate and forming with said second plate a system having an inertia greater than that of said first named system, means for applying pressure to one of said movable plates to compress the material contained therein, and at least one resilient element interposed between said pressure means and said movable plate in such fashion that the pressure is applied resiliently.

10. An apparatus for producing molded bodies of concrete and the like, which comprises a frame, a mold, means for supporting said mold resiliently in said frame, two movable plates forming opposite walls of said mold, vibrators directly attached to one of said plates adapted to vibrate said plate inelastically, means for applying resilient pressure to said plate to compress the concrete; said vibrators and said plate forming a vibrating system of relatively small inertia; a heavy weight directly attached to the second movable plate tending to damp out the vibrations produced by said first plate and forming with said second plate a system of relatively high inertia, and means for removing the molded concrete from the mold.

KNUT VILHELM LINDKVIST.